United States Patent [19]

Baus

[11] Patent Number: 4,965,894
[45] Date of Patent: Oct. 30, 1990

[54] MIXING DEVICE

[75] Inventor: Heinz G. Baus, Hünibach-Thun, Switzerland

[73] Assignee: Altura Leiden Holding B.V., Maastricht, Netherlands

[21] Appl. No.: 263,902

[22] Filed: Oct. 28, 1988

[30] Foreign Application Priority Data

Oct. 28, 1987 [DE] Fed. Rep. of Germany ....... 3736406
Oct. 11, 1988 [DE] Fed. Rep. of Germany ....... 8116856

[51] Int. Cl.⁵ ............................................... A47K 3/22
[52] U.S. Cl. .......................................... 4/605; 239/305
[58] Field of Search .................. 4/597, 598, 605, 615, 4/567; 239/304, 305

[56] References Cited

U.S. PATENT DOCUMENTS

| | | | |
|---|---|---|---|
| 3,322,350 | 5/1967 | Heinicke et al. | 239/304 X |
| 4,218,013 | 8/1980 | Davison | 239/305 X |
| 4,322,031 | 3/1982 | Gehlert | 236/12 |
| 4,563,780 | 1/1986 | Pollack | 4/605 X |
| 4,621,770 | 11/1986 | Sayen | 239/304 |

FOREIGN PATENT DOCUMENTS 2925234  5/1981  Fed. Rep. of Germany .

*Primary Examiner*—Charles E. Phillips
*Attorney, Agent, or Firm*—Foley & Lardner, Schwartz, Jeffery, Schwaab, Mack, Blumenthal & Evans

[57] ABSTRACT

A mixing device, for showers or baths, contains a mixing fitting to which hot and cold water may be fed and which comprises an element for adjusting the mixing ratio. The mixing device is to be developed so that, although the design thereof is simple, a preparation may be added to the mixed water. To this end there is provided an electronic control-unit and an input-unit which, for the purpose of actuating a storage-unit comprises at least one container for the accommodation of the preparation. Also, there is provided a supply device, preferably in the form of a pump, by means of which, upon actuating the input unit, the preparation may be released from the dispenser through lines, more particularly flexible tubes.

8 Claims, 5 Drawing Sheets

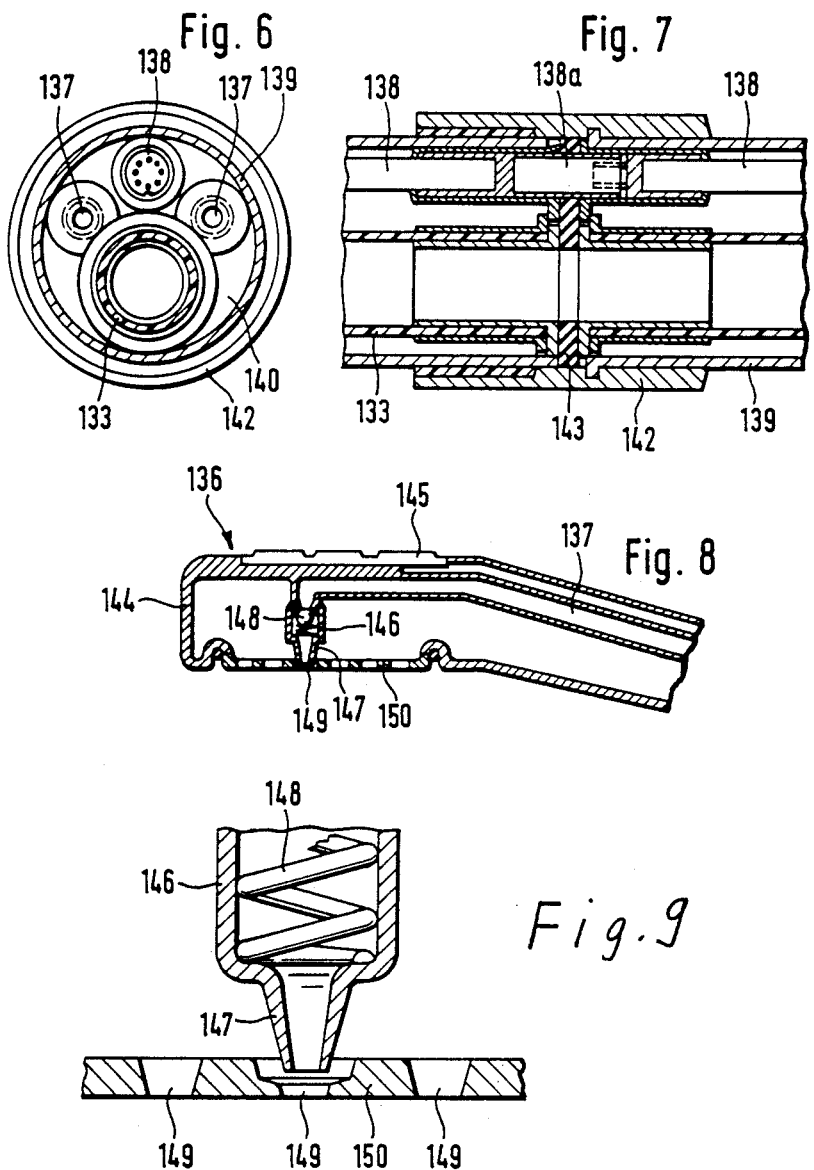

MIXING DEVICE

BACKGROUND OF THE INVENTION

1. Field of the invention

The present invention relates to a mixing device, more particularly for showers or baths, having a mixing fitting to which hot and cold water may be fed and which comprises an element for adjusting the mixing ratio of the water.

2. Description of the Prior Art

The German document No. 29 25 234 discloses a mixing device of this kind for the preparation of mixed water, the temperature of which may be preselected in accordance with the adjusted mixing ratio of the supplied hot and cold water. The device contains an electric-motor drive and a sensor which detects the outlet temperature of the mixed water and is connected to a regulating unit, the latter being used to adjust the mixing ratio of the mixed water, and therefore the temperature thereof, in accordance with a set desired value. Adjustment of the desired value for the temperature of the mixed water is effected directly in the mixing fitting, but remote control is not possible. Moreover, preparations such as lotions, shampoos, showering agents, bath-additives, or the like cannot be added to the mixed water.

OBJECTS OF THE INVENTION

It is an object of the invention to develop a device of this kind in order to provide rapid and reliable adjustment of, or change in, the temperature of the mixed water. If necessary, it is to be possible to effect the adjustment externally, for example directly from the shower-head. It is also to be possible to add to the mixed water, as required, an agent such as a lotion, at the same time ensuring simple maintenance and adjustment. The device is to be compact and easily handled by the user. It is to be possible to install the device simply in a shower-stall, bathroom, or the like and it is to be a simple matter for the user to add the desired preparation to the device, so that it can be fed to a shower-head as required through suitable lines, hoses or the like, more particularly to a shower-head.

This object is accomplished by the present application.

SUMMARY OF THE INVENTION

According to the present invention, there is provided a mixing device for showers or baths, having a mixing fitting to which hot and cold water may be fed and which comprises an element for adjusting the mixing ratio, comprising;
  an electronic control-unit and an input-unit,
  a dispenser having at least one lotion-container for the accommodation of a preparation; and
  a supply-device by means of which, upon actuating the input-unit, the preparation may be released from the dispenser.

The device according to the invention has a simple and reliable design. It permits rapid and reliable adjustment of the temperature of the mixed water. Changes in the temperature and/or pressure of the supplied cold or hot water are very quickly corrected by the electronic control-unit which actuates the adjusting unit. Adjustment and preselection of the temperature is effected by means of the input-unit which, according to the invention, may be arranged at a distance from the mixing fitting, more particularly in a shower-head.

Preferably, the mixing fitting is located in a housing comprising a unit indicating the actual mixing temperature. Preferably, also arranged in this housing is the electronic control-unit and a battery supplying the current.

Preferably, the device and the housing in particular, comprises a receptacle for the battery which may thus be removed, when required, recharged and replaced. In view of the current supplied by this battery, there is no need for a connection to the mains, or to a mains transformer, so that the high degree of safety required in the wet area of a shower or bath can be assured.

The device is also preferably provided with an indicator showing the state of charge of the battery, to allow the battery to be recharged or replaced in good time.

The control-unit, and the element for a pump, may preferably be arranged externally of the control-unit, more particularly in the shower-head.

Located in the usual manner between the housing and the shower-head is preferably a flexible tube for the water and also electrical leads carrying the electrical signals for actuation of the electronic control-unit.

BRIEF DESCRIPTION OF THE DRAWINGS

Preferred embodiments of the invention is explained hereinafter in greater detail, as examples without limitative manner, with reference to the attached drawings, wherein:

FIG. 6 shows a shower-hose with a multiple coupling piece;

FIG. 7 is a cross-section through the coupling piece according to FIG. 6;

FIG. 8 shows a shower-head; and

FIG. 9 shows, to an enlarged scale, part of a valve with its nozzle and a means for preventing the preparation from leaking.

DESCRIPTION OF AN EXEMPLARY EMBODIMENT

Figure 1:
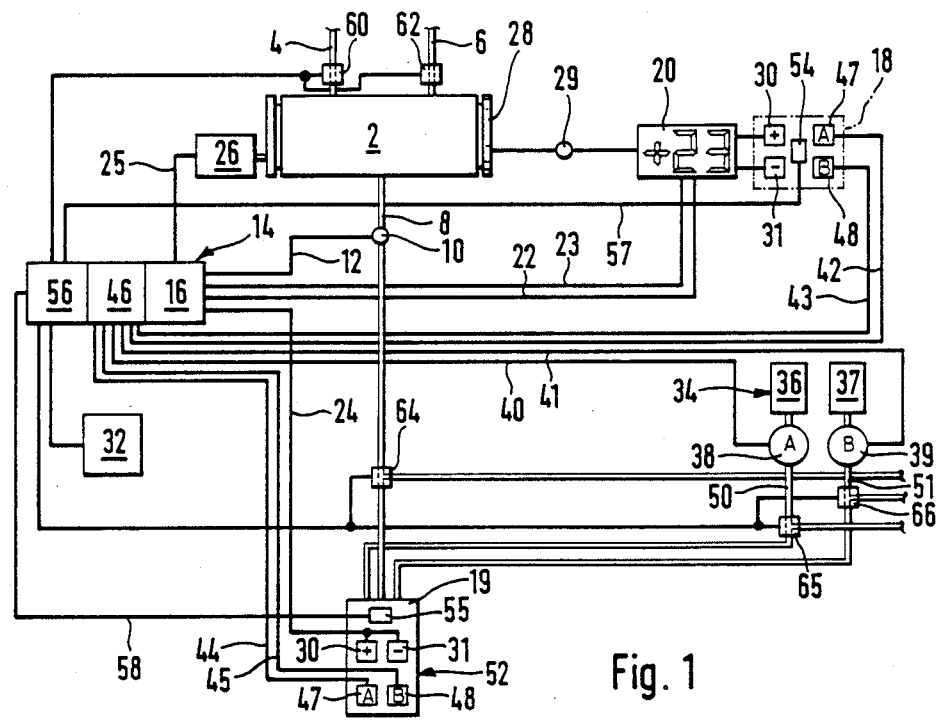
FIG. 1 is an operating diagram of a first embodiment.

Referring to the drawings, FIG. 1 is a functional diagram of the device which has a mixing fitting (or mixing valve) 2 to which hot and cold water can be fed through two water-pipes 4,6. This mixing valve contains an internal adjusting element which is used to alter the mixing ratio of hot and cold water. The water, mixed to the desired temperature, flows away through an output-line 8. Arranged in line 8, as close as possible to mixing valve 2, is a temperature-sensor 10 which is connected, through an electrical lead 12, to an electronic control-unit 14.

The electronic control-unit 14 contains a first electronic unit 16 controlling the mixing fitting 2. Connected to the first electronic unit 16 is not only temperature-sensor 10, but also an input-unit 18 and an indicator-unit 20, through electrical leads 22,23. The input 18 and indicator 20 units may be arranged in the same housing as the mixing fitting 2. As will be explained hereinafter, an additional input-unit 19 may also be arranged externally in the shower-head. This additional input-unit 19, is also connected, through an electrical lead 24, to the first electronic unit 16, so that input signals may be fed to electronic control-unit 14 selectively through lead 22 or lead 24. Finally, an adjusting unit 26 is connected to the first electronic unit 16 electrically through lead 25. The adjusting unit 26 is in the form of a direct-current motor which, by means of a shaft, gearing, or some other positive connection, may adjust the mixing valve adjusting element in one direction or the other for the purpose of presetting the mixing temperature. The mixing fitting 2 also contains an adjusting wheel 28 which allows the mixing temperature to be adjusted manually if necessary. Such manual adjustment may be desirable, for example in the event of a power-failure and/or for preadjustment. The input-units 18,19 contain two keys 30,31 provided with plus and minus signs. For example, by actuating the plus-key 30, the temperature may be increased and the value of the mixing temperature detected by sensor 10 in the output-line 8 appears in the indicator-unit 20. The latter is in the form of a digital indicator to which appropriate pulses are fed from the first electronic unit 16. The latter regulates the adjusting unit 26 in such a manner that the temperature measured in the output-line 8 with sensor 10 corresponds to the desired water-temperature, the mixing ratio of hot and cold water being regulated in the required manner.

The mixing valve 2 also contains a device 29 providing protection from scalding. This is in the form of a mechanical lock in the mixing valve 2 serving to shut off the adjusting unit and/or the adjusting element above a specific adjustable water-temperature. The device must be actuated manually.

For the purpose of providing power to the electronic control-unit 14, to the indicator 20, and to the adjusting unit 26, a rechargeable battery 32 is provided. There is thus no connection to the mains. This provides full compliance with the safety regulations applicable to wet areas and eliminates any risks arising from the use of a mains transformer.

The device according to the invention also contains at least one dispenser or delivery-unit 34, two separate lotion containers 36,37, and pumps 38,39. The desired preparation, such as a lotion, shampoo, showering agent, or the like, may be filled into the lotion containers 36,37. The pumps 38,39 are connected, through electrical leads 40,41, to a second electronic unit 46 of the electronic control-unit 14. The input-units 18,19 are connected, through electrical leads 42 to 45, to the second electronic unit 46 and also contain two keys 47,48 carrying the letters A and B, for example. By depressing the keys 47,48 which, for the sake of clarity, also carry the letters A and B, the pumps 38,39 can be triggered in order to release the desired preparation from the lotion-containers 36,37, through lines 50,51, selectively to the shower-head 52 or to a water outlet not shown here, for example to a bathtub. The pumps 38, 39 are controlled by the second electronic unit 46, being set in operation by actuating the keys A and B. Arranging the input-unit 19 in the shower-head 52 ensures particularly simple operation within the scope of the invention.

The input-units 18,19 also contain at least one additional key 54,55 connected to a third electronic unit 56 through leads 57,58. This third electronic unit is connected, through an additional electrical lead 59 containing solenoid-valves 60,62, to water-pipes 4,6. The flow of hot and cold water may thus be opened or closed by actuating keys 54,55.

Changing over the flow of mixed water and lotion to the shower-head 52, or to the water-outlet may also be effected accordingly. To this end, three-way valves 4,65,66 are provided, and these are adapted to be triggered, through corresponding leads, by a third electronic unit 56. This allows the output-line 8 and the pump-lines 50–51 to be connected selectively to lines leading to the shower-head 52 and to the water-outlet.

In the case of the embodiment explained hereinbefore, the lotion is fed by means of pumps, but other feeding devices may be provided according to the invention, more particularly jet pumps. In this case the lines 50,51 are suitably connected to the output-line 8. Thus the pressure of water flowing in the output-line 8 produces, if necessary, a negative pressure in the lines 50,51. Instead of the pumps 38,39, solenoid-valves may be provided and these may be opened, when required, to provide a connection to the lotion in the containers 36,37. When the valves are open, the negative pressure causes the desired lotion to be drawn up by the water flowing in the output-line and to be mixed therewith.

Figure 2:
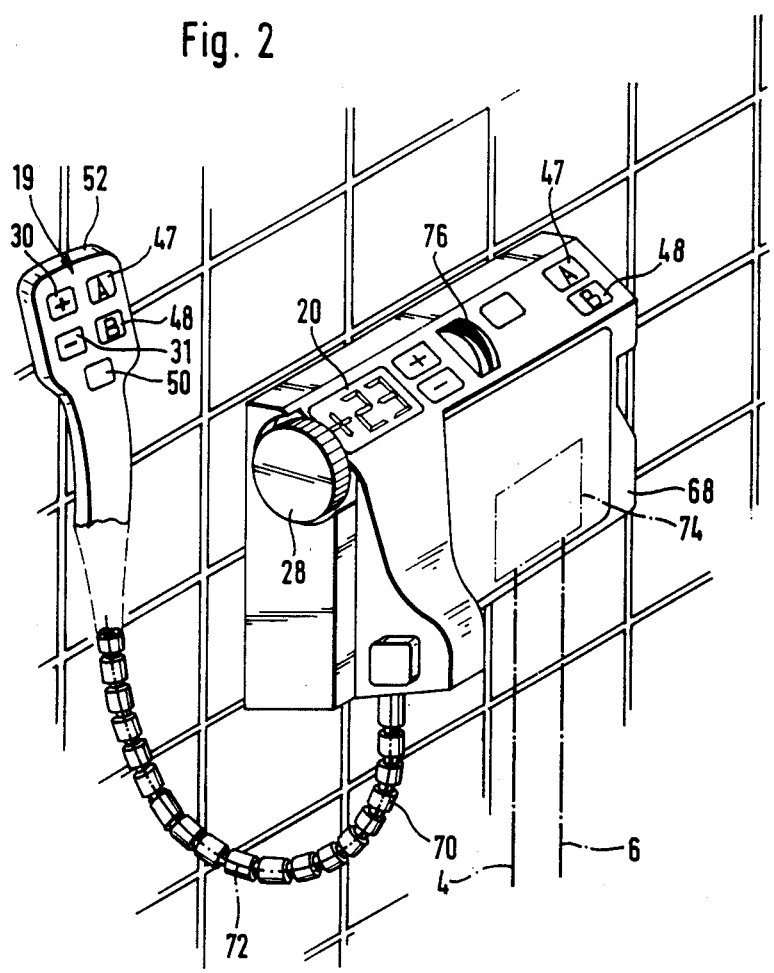
FIG. 2 is a perspective view of a device according to FIG. 1.

FIG. 2 is a diagrammatical representation of the device as a whole, arranged as a prefabricated unit on the wall of a shower or over a bathtub. The water-pipes 4,6, located as usual in the wall under the tiles, are shown in broken lines and are suitably connected to the device. The latter comprises a housing 68 in which the components mentioned in connection with FIG. 1 are arranged. Connected to the housing 68 is a flexible tube 70 running to the shower-head 52 and connecting the latter to the output-line. The flexible tube 70 also contains a cable 72, shown in broken lines, containing the electrical leads running to the input-unit 19. Located on the back of the shower-head 52 are keys 30,31 for selecting the temperature, keys 47,48 for triggering the pumps and the devices feeding the lotions and, finally, key 55 which supplies water or changes it over.

The housing 68 contains a receptacle 74 into which the battery may be introduced, for example from below. The storage-capacity of the battery is monitored by the electronic control-unit, the figures in digital indicator-unit 20 being caused to blink if the charge is too low. The basic adjustement of the temperature is preferably effected manually by means of adjusting wheel 28 to which an optical display 76 is coupled. The user may raise or lower the temperature by actuating the keys 30,31, the temperature of the mixed water in the output-line being indicated to him by means of the digital indicator-unit 20.

Figure 3:
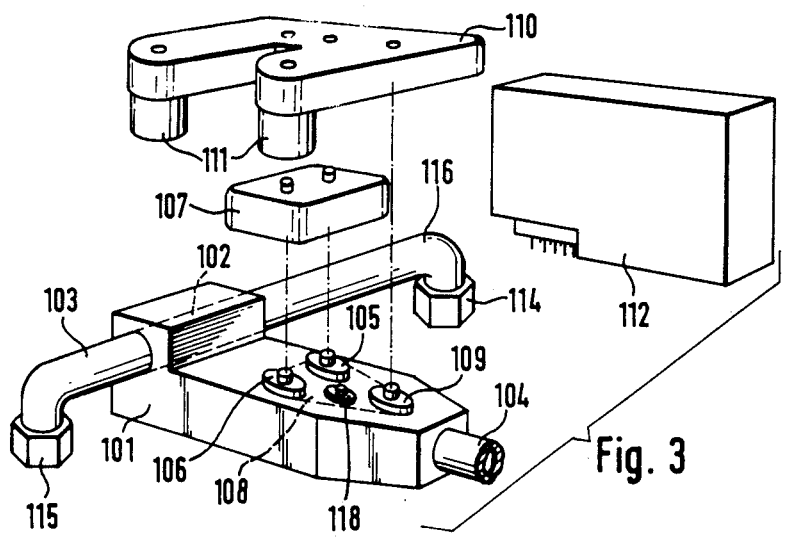
FIG. 3 is an exploded view of a mixing fitting with gearing and an electronic unit according to the invention.

FIG. 3 is a perspective representation of the mixing fitting with gearing and an electronic unit. Running to a fitting-housing 101 are a cold-water line 102 and a hot-water line 103. Also present is an outlet line 104. The cold and hot water are regulated by separate valves 105,106 which are coupled together by gearing 107. In this connection it is essential that when the cold-water valve 105 is opened, the hot-water valve 106 be closed by the gearing 107, and vice-versa. The fitting-housing 101 contains a mixing chamber 108 arranged after the valves. This receives the mixed water which is regulated by a third valve 109 located ahead of the mixed-water outlet line 104. The aforesaid movements, regulating the cold water, the hot water and the mixed-water outlet, are each connected, through the gearing 110, to a drive in the form of an electric motor which is triggered by built-in electronic unit 112. The two movements may also be carried out manually by means of two adjusting wheels (see FIG. 4). This allows the device to be operated manually in the event of a power failure. Connections 114,115 for the cold- and hot-water lines are laid out in such a manner that, merely by exchanging an elbow 116, the different distances arising in each installation can easily be bridged. The actual temperature of the water in mixing chamber 108 may be measured by means of temperature-sensor 118.

Figure 4:
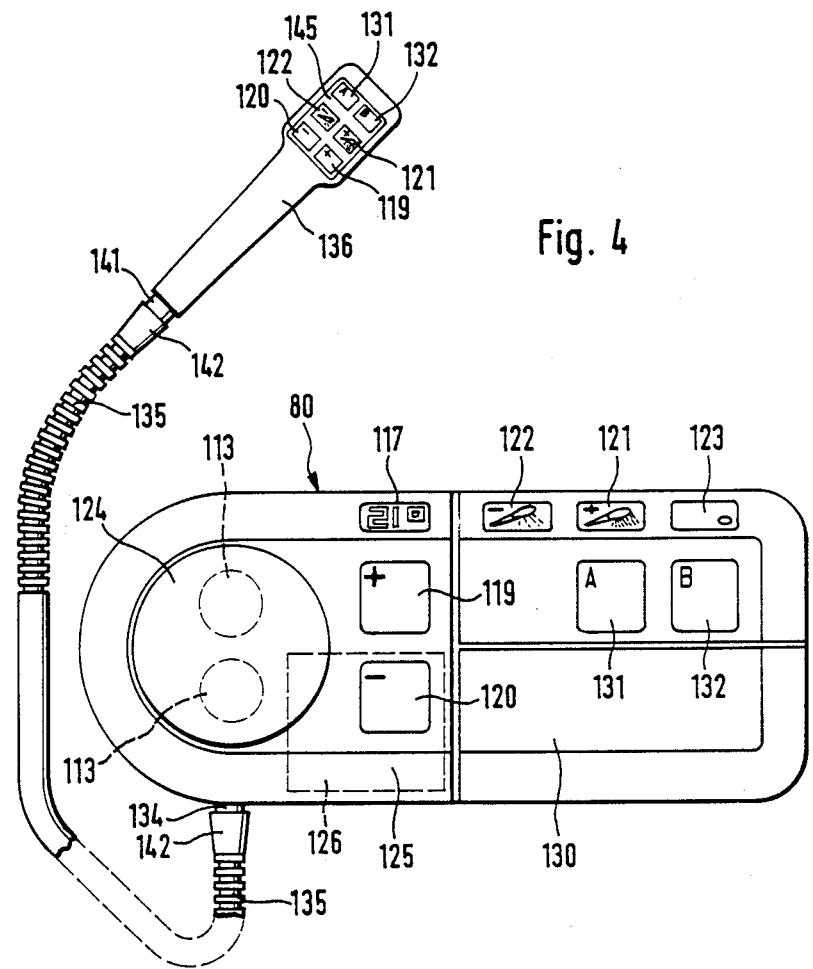
FIG. 4 is an overall view of a second embodiment which contains a shower-head and which can be secured to the wall (surface) of a shower-stall or bathroom.

FIG. 4 is an overall view of the mixing device having a housing 80 which is secured to the wall of a shower-stall or bathroom and covers the mixing fitting explained in FIG. 3. The fitting is located in the left-hand part and the aforesaid adjusting wheels 113 for manual operation are shown in broken lines. Located in the housing 80 above the adjusting wheels 113 is a removable cover 124, the adjusting wheels being therefore accessible for manual operation of the mixing fitting in case of need. Also arranged in the left-hand part of the housing is a replaceable battery 126. To this end, the housing 80 has a cover 125 which may be opened for replacement of the battery 126. Keys 119,120, provided with plus and minus signs are used to set the desired mixing temperature. The actual value in the mixing chamber, measured with the temperature-sensor, is displayed on the indicator-unit 117 in the inoperative position. When the keys 119,120 are actuated, the desired temperature appears, on the same indicator-unit 117, the change-over taking place automatically when the keys are actuated. At the same time, the device switches over automatically to the operating position. The mixing valves 105,106, illustrated in FIG. 3 are now set to the position corresponding to the adjusted temperature by the electrical drive 111 and gearing 110. Also provided are keys 121, 122 for the mixed water. The mixed-water outlet-valve 109 is opened, when the plus-key 121 is actuated, by the electrical drive 111 and the gearing 110. The amount of water released is also regulated by actuating the plus key 121 or the minus key 122. The electronic unit 112 now controls the preset water temperature continuously. The actual temperature measured in the mixing chamber by sensor 118 is compared with the desired temperature fed-in and, in the event of a deviation in excess of 1° C., is readjusted. The readjustment also takes place in the event of a change in pressure and/or temperature in the supply lines. The preset temperature may obviously also be changed at any time while the shower is in use, merely by actuating the keys 119,120.

The mixing device also contains a safety device which ensures that the mixed water does not exceed a preset maximal value. To this end, the electronic unit 112 is set at a maximal temperature, preferably about 38° C., in the shops. If a higher temperature is desired, this electrical lock may be released by actuating the temperature plus key 119 together with a safety key 123. After the water has been turned off, the 38° C. limit set in the shops is automatically restored. In addition to this, after the showering process comes to an end, or if no keys are actuated over a given period of time, namely between three and five minutes, the device is automatically switched off. This automatic switch-off, essential to the invention, produces the following results:

the outflow valve is closed
the mixing valves are shifted to the "cold" setting
the desired value of the temperature of the mixed water returns to the basic value
the regulating and output parts are switched off.

On the one hand, this automatic switch-off ensures convenient actuation and handling; on the other hand, a substantial amount of energy is saved. The mixing device shuts off automatically under the following circumstances:

when cover 124 is opened for manual operation
when cover 125 is opened to replace battery 126
when the voltage, especially the output-voltage, of the battery drops below a predetermined value.

Under the foregoing circumstances, the basic positions, namely cold, closed, nominal basic value, are set before switching off. Indicator-unit 117 also serves to display any drop in battery voltage below a predetermined value so that the user can replace the battery.

The device also comprises a dispenser which is advantageously arranged elsewhere under housing 80. This dispensing or delivery unit is arranged in another part of housing 80, namely on the right-hand side thereof, as shown in FIG. 4. The housing comprises a cover 130 which can be removed, more particularly opened, forwardly in front of the plane of the drawing. Located therebehind is at least one container for a lotion, showering agent, shampoo, or the like. In the illustrated embodiment, two such containers are provided, so that two different preparations can be accommodated and delivered. Also provided are pumps, which will be dealt with hereinafter, the control thereof being effected by the electronic unit when the keys 131,132 are actuated.

The outlet-line from the mixing-fitting housing consists of five parts, to wit a water-hose 133, two hoses 137 for supplying the preparations located in the containers, an electrical cable having a multiple plug, a coupling 138 for connection to the electronic unit, and a mobile outer sheath 139. The connection 134 to the device, and a connection 141 to shower-head 136, are provided for the shower-hose. The hose carries at each end a multiple-coupling part with a union-nut 142. Suitable seals are provided.

Figure 5:
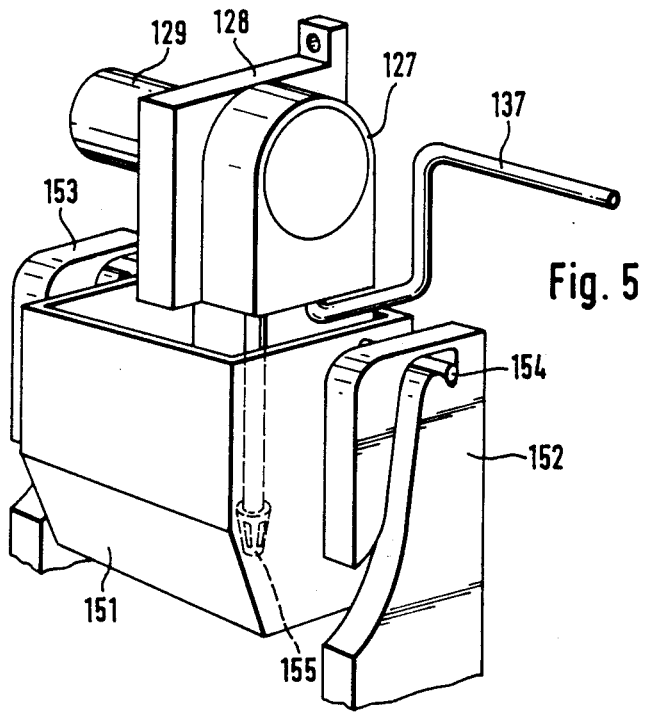
FIG. 5 is a perspective view of a dispenser, with a container for the preparation according to the invention.

FIG. 5 shows a container 151 for the dispenser or delivery-unit, located behind the housing-cover. Container 151 is arranged to be removed from the housing in guides 152,153. To this end, the guides carry grooves accommodating lateral pins 154 extending from the container 151. The container may be lowered by lifting it slightly and moving it slightly forwards. This dispenser-unit also contains a pump 127 which is preferably in the form of a hose-pump and is adapted to be driven by an electric motor 129 through gearing 128. Connected to the pump 127 is a hose 137 running to the shower-head. As already indicated, the dispensing or delivery-unit as a whole contains, in this embodiment, at least two such dispensing units. The actuation is effected by the keys 131,132 marked A and B in FIG. 4 and the electronic unit already described. Projecting upwardly in the container 131 is a suction-pipe 155 through which the preparation is drawn up and delivered through the hose 137.

FIGS. 6 and 7 show radial and axial sections of the multiple coupling. Surrounded by an outer sheath 139 are shower-hose 133 for the mixed water, two hoses 137 for the preparation, and electrical cable 138. The latter contains a plurality of cores which are connected together electrically by suitable plugs 138a. Located at each end of the hose is a multiple coupling part 140 adapted to be connected by union-nuts 142 to the respective connections. The connection for shower-hose 133 carries a seal 143. The multiple coupling simplifies the replacement of the shower-head or of the entire shower-hose.

FIGS. 8 and 9 are diagrammatical representations of the shower-head 136 which comprises a housing 144 and a group of keys 145 which perform the following functions directly at the shower-head:
opening and closing the mixed water outlet-valve (regulating the amount of water released)
altering the temperature of the water
selecting one of the preparations A or B.

As may be gathered from FIG. 4, the group 145 contains a total of six keys 119 to 122, 131,132. These perform the same functions as the similarly numbered keys in the housing 80 secured to the wall. As shown in FIGS. 8 and 9, in the shower-head is a valve 146 with a nozzle 147 and a device 148 to prevent leakage. This valve 146 is arranged in such a manner that the preparation, be it a showering-agent, a lotion or whatever, can flow through a normal outlet aperture 149. The device for preventing leakage ensures that the preparation can emerge from the hose 137 only when the preparation is delivered by the dispenser-pump under pressure.

The dispenser has two operating modes:
1. delivering the preparation when the jet of water is shut off
2. delivering the preparation when the jet of water is flowing.

The water may be shut off by depressing the minus-sign key 122 (see FIG. 4) either in the housing 80 or on the shower-head 136. If the A key 131 or the B key 132 is actuated, either in the housing 80 or on the shower-head 136, the corresponding preparation is pumped through the hose 137 to the shower-head 136, through the valve 146, the nozzle 147 and the outlet-aperture 149 in the screen 150 (FIGS. 8 and 9). On the other hand, if the jet of water is turned on, when the A key 131 or the B key 132 is actuated in the housing 80 or on the shower-head 136, the preparation is mixed with the emerging jet of water as a result of the special arrangement of the nozzle 147.

Although, the invention was described hereinabove with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A mixing device for showers or baths comprising:
a mixing fitting to which hot and cold water may be fed and which comprises an element for adjusting the mixing ratio;
an electronic control-unit;
an input-unit;
a dispenser having at least one lotion-container for the accommodation of a preparation, wherein said mixing fitting, on the one hand, and said dispenser, on the other hand, are designed and arranged as separate operating groups;
a supply-device by means of which, upon actuating said input-unit, the preparation may be released from said dispenser; and
a single housing in which said mixing fitting, said electronic control-unit, said input-unit, said dispenser and said supply device are arranged, wherein said housing comprises a first cover which is connected debatably thereto and is adapted to be opened, and at least one container for the preparation being arranged behind said cover, said container being movably arranged on guides and being movable out of said housing when said first cover is opened.

2. A device according to claim 1, comprising a further input-unit arranged externally of said housing and electrically connected to said electronic control-unit, wherein said input-units comprise at least one key for adjusting a target value of the temperature of said mixed water, and said housing further comprises an indicator unit for displaying the temperature of said mixed cold and hot water at a water outlet of the mixing fitting.

3. A device according to claim 2, wherein said further input-unit is arranged in a shower-head, and further comprising a first flexible tube in which a second flexible tube for the mixed water, and a cable by means of which an electrical connection is established between said further input-unit and said electronic control-unit are arranged, and wherein said further input-unit comprises at least one key for regulating the amount of water released.

4. A device according to claim 1, wherein said at least one container is removably arranged in said guides and is open at the top so that it can be refilled without removing a cap.

5. A device according to claim 1, further comprising a shower head connected to said mixing fitting by a flexible tube for said mixed water; a separate line with a suction-pipe associated with each said at least one container; a pump associated with each separate line for withdrawing preparation from the associated container; and a separate flexible tube associated with each pump for delivering said preparation to said shower-head; wherein each separate flexible tube and said flexible tube for said mixed water are arranged in a flexible sheath extending between said housing and said shower head.

6. A device according to claim 5, wherein each said pump is a hose-pump and is adapted to be drive through a gearing by an electric motor, and wherein valves for the hot and cold water or a valve for the mixed water are adapted to be actuated manually, by means of two adjusting wheels, said adjusting wheels being arranged behind a detachable second cover.

7. A device according to claim 5, wherein said flexible tubes are arranged in said shower head in such a manner that said preparation can be emitted through an aperture in said shower head.

8. A device according to claim 7, wherein said input units in said housing and said shower head comprise keys for actuating each said pump to deliver a preparation from the associated container to said shower head.

* * * * *